United States Patent
Tsujioka et al.

(10) Patent No.: US 10,710,606 B2
(45) Date of Patent: Jul. 14, 2020

(54) ELECTRIC POWER SUPPLY APPARATUS AND VEHICLE

(71) Applicant: HONDA MOTOR CO., LTD., Minato-ku, Tokyo (JP)

(72) Inventors: Takashi Tsujioka, Wako (JP); Masashi Sugita, Wako (JP); Osamu Sato, Wako (JP); Kazuhiro Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 16/170,578

(22) Filed: Oct. 25, 2018

(65) Prior Publication Data

US 2019/0126940 A1   May 2, 2019

(30) Foreign Application Priority Data

Oct. 27, 2017 (JP) ................. 2017-207950

(51) Int. Cl.
  *B60W 50/10* (2012.01)
  *B60R 16/033* (2006.01)
  *B60W 40/12* (2012.01)
  *B60W 50/04* (2006.01)

(52) U.S. Cl.
  CPC ........... *B60W 50/10* (2013.01); *B60R 16/033* (2013.01); *B60W 40/12* (2013.01); *B60W 50/04* (2013.01); *B60W 2720/103* (2013.01); *B60W 2720/106* (2013.01); *B60W 2720/24* (2013.01)

(58) Field of Classification Search
  CPC ...... B60W 50/10; B60W 40/12; B60W 50/04; B60W 2720/103; B60W 2720/106; B60W 2720/24; B60R 16/033
  See application file for complete search history.

(56) References Cited

U.S. PATENT DOCUMENTS

| 10,300,906 | B2 * | 5/2019 | Oguma | ................. B60W 20/13 |
| 2013/0162030 | A1 * | 6/2013 | Sonesson | .................. B60L 1/00 307/10.1 |
| 2016/0021712 | A1 * | 1/2016 | Nakamura | ......... H05B 33/0809 315/82 |

FOREIGN PATENT DOCUMENTS

| JP | 2003-015742 A | 1/2003 |
| JP | 2003-327058 A | 11/2003 |
| JP | 2005-170070 A | 6/2005 |
| JP | 2011-195101 A | 10/2011 |
| WO | 2016/080452 A1 | 5/2016 |

OTHER PUBLICATIONS

Office Action dated Aug. 6, 2019 issued over the corresponding Japanese Patent Application No. 2017-207950 with the English translation thereof.

* cited by examiner

*Primary Examiner* — Jared Fureman
*Assistant Examiner* — Duc M Pham
(74) *Attorney, Agent, or Firm* — Carrier Blackman & Associates, P.C.; Joseph P. Carrier; William D. Blackman

(57) ABSTRACT

An electric power supply apparatus for a vehicle includes a second switch for performing ON/OFF switching of electric power supply from a second power supply to a second control unit, a third switch for performing ON/OFF switching of a first drive signal to the second switch, and a switch control circuit for outputting a second drive signal to the second switch when predetermined conditions are satisfied. The second switch is turned on when the first drive signal or the second drive signal is input, and the second switch is turned off when the first drive signal and the second drive signal are not input.

10 Claims, 8 Drawing Sheets

ELECTRIC POWER SUPPLY APPARATUS AND VEHICLE

CROSS-REFERENCE TO RELATED APPLICATION

This application is based upon and claims the benefit of priority from Japanese Patent Application No. 2017-207950 filed on Oct. 27, 2017, the contents of which are incorporated herein by reference.

BACKGROUND OF THE INVENTION

Field of the Invention

The present invention relates to an electric power supply apparatus and a vehicle including a plurality of electric power systems.

Description of the Related Art

An object of Japanese Laid-Open Patent Publication No. 2005-170070 is to provide a power supply device for a vehicle capable of controlling power supply for in-vehicle electric equipment even when either an ignition switch (SW) or a brake SW is broken down during traveling (paragraph and Abstract). In order to achieve the above object, the power supply device of Japanese Laid-Open Patent Publication No. 2005-170070 includes a CPU 12, a battery 2, an ignition switch 3 provided between the battery 2 and the CPU 12, and a power supply circuit (Abstract).

The CPU 12 controls the electric equipment for the vehicle (Abstract). The battery 2 supplies electric power to the CPU 12. The power supply circuit supplies electric power to the CPU 12 bypassing the ignition switch 3 from the battery 2. A self-retaining relay 7 is provided on the power supply circuit and activated by a signal from a predetermined vehicle switch 4. The CPU 12 outputs a relay control signal to the self-retaining relay 7.

In the structure, after the electric power is supplied to the power supply circuit (control means), it is possible to control start/stop of operation of the self-retaining relay 7 (relay means) from the power supply circuit. According to the disclosure, in the structure, even in the case where a failure occurs in one of the ignition switch SW and the vehicle SW4 which serves as a trigger for activating the self-retaining relay 7, it is possible to control power supply for the electric equipment for the vehicle (paragraph [0008]).

SUMMARY OF THE INVENTION

As described above, Japanese Laid-Open Patent Publication No. 2005-170070 aims to make it possible to control supply of electric power to the in-vehicle electrical equipment even in the case where a failure occurs in one of the ignition switch SW, the vehicle SW4, etc. However, in Japanese Laid-Open Patent Publication No. 2005-170070, cases where two electric power systems are provided have not been studied.

The present invention has been made taking such cases into consideration. An object of the present invention is to provide an electric power supply apparatus and a vehicle that can be used suitably in structure having two electric power systems.

An electric power supply apparatus according to the present invention includes a first power supply configured to supply electric power to a first control device configured to control a vehicle, a second power supply configured to supply electric power to a second control device configured to control the vehicle, a first switch configured to perform ON/OFF switching supply of electric power from the first power supply to the first control device, a second switch configured to perform ON/OFF switching of supply of electric power from the second power supply to the second control device, a third switch configured to perform ON/OFF switching of a first drive signal to the second switch, and a switch control device configured to output a second drive signal to the second switch when a predetermined condition is satisfied.

The first switch and the third switch are turned on by common operation by an occupant. The second switch is turned on when the first drive signal or the second drive signal is inputted, and the second switch is turned off when the first drive signal and the second drive signal are not input.

In the present invention, electric power for the first control device is supplied from the first power supply, and electric power for the second control device is supplied from the second power supply. For this purpose, electric power is supplied to the first control device and the second control device using different power supply systems (first and second electric power systems). Therefore, even in the case where abnormality occurred in one of the electric power systems, it is possible to continue control of the vehicle by the first control device or the second control device using the other of the electric power systems.

Further, the first switch and the third switch are turned on by the occupant's common operation. Therefore, it becomes possible to start supply of electric power to the first control device and the second control device by the occupant's common operation. Specifically, when the first switch is turned on, supply of electric power from the first power supply to the first control device is started. Further, when the third switch is turned on, the first drive signal is inputted to the second switch, and the second switch is turned on. As a result, supply of electric power from the second power supply to the second control device is started.

It may be considered that the first switch and the second switch are turned on by the common operation without using the third switch. However, in such a case, if the electric power for turning on the first switch and the second switch is supplied from the first power supply, once the supply of electric power from the first power supply is interrupted, it becomes impossible to keep the first switch and the second switch in the ON state.

In the present invention, the second switch is turned on when the first drive signal or the second drive signal is inputted, and the second switch is turned on when the first drive signal and the second drive signal are not input. Therefore, by interruption of supply of electric power from the first power supply, even in the case where it becomes impossible to keep the "third switch" in the ON state, it is possible to keep the second switch in the ON state with the second drive signal from the switch control device. Stated otherwise, in the case where the first control device is stopped, and at the same time, the third switch is turned off by interruption of supply of electric power from the first power supply, it becomes possible to keep the second switch in the ON state with the second drive signal, and continue supply of electric power from the second power supply to the second control device.

Further, even in the case where the second drive signal cannot be inputted to the second switch for some reasons (disconnection of the second signal line for the second drive signal, etc.), it becomes possible to continue supply of electric power to the second control device by inputting the first drive signal to the second switch.

As described above, in the present invention, it becomes possible to suitably use the electric power supply apparatus in the structure having the two electric power systems.

An electric power supply apparatus according to the present invention includes a first power supply configured to supply electric power to a first control device configured to control a vehicle, a second power supply configured to supply electric power to a second control device configured to control the vehicle, a second switch configured to perform ON/OFF switching of supply of electric power from the second power supply to the second control device, a third switch configured to perform ON/OFF switching of a first drive signal to the second switch, and a switch control device configured to output a second drive signal to the second switch when a predetermined condition is satisfied.

The second switch is turned on when the first drive signal or the second drive signal is inputted, and the second switch is turned off when the first drive signal and the second drive signal are not input.

In the present invention, electric power for the first control device is supplied from the first power supply, and electric power for the second control device is supplied from the second power supply. For this purpose, electric power is supplied to the first control device and the second control device using different power supply systems (first and second electric power systems). Therefore, even in the case where abnormality occurred in one of the electric power systems, it is possible to continue control of the vehicle by the first control device of the second control device using the other of the electric power systems.

Further, it may be possible to consider that the second switch is turned on without using the third switch. However, if electric power for turning on the second switch is supplied from the first power supply, due to interruption of supply of electric power from the first power supply, it becomes impossible to keep the second switch in the ON state.

In the present invention, the second switch is turned on when the first drive signal or the second drive signal is inputted, and the second switch is turned off when the first drive signal and the second drive signal are not input. Therefore, even if it becomes impossible to keep the "third switch" in the ON state due to interruption of supply of electric power from the first power supply, the second switch can be kept in the ON state with the second drive signal from the switch control device. Stated otherwise, even in the case where the first control device is stopped and at the same time, the third switch is turned off due to interruption of supply of electric power from the first power supply, it becomes possible to keep the second switch in the ON state, and continue supply of electric power from the second power supply to the second control device.

Further, even in the case where the second drive signal cannot be inputted to the second switch for some reasons (disconnection of the signal line for the second drive signal, etc.), it becomes possible to continue supply of electric power to the second control device by inputting the first drive signal to the second switch.

As described above, in the present invention, it becomes possible to suitably use the electric power supply apparatus in the structure having the two electric power systems.

Outputting the second drive signal from the switch control device is triggered by operation of a drive source of the vehicle being started or by an occupant providing an instruction to start driving assistance by the first control device or the second control device.

In this manner, it becomes possible to supply electric power to the second control device in a situation where it is highly necessary to supply electric power to the second control device. When outputting the second drive signal is triggered by operation of the drive source of the vehicle being started, for example, by supplying electric power to the second control device before the occupant provides an instruction to start driving assistance, it becomes possible to start operation of the second control device beforehand and start driving assistance by the second control device immediately after the instruction to start driving assistance is provided.

Further, when the output of the second drive signal is triggered by the occupant's instructions to start driving assistance by the first control device or the second control device, it becomes possible to suppress standby electric power of the second control device before performing the driving assistance. In particular, when outputting the second drive signal is triggered by the occupant's instructions to start driving assistance by the first control device, even if it is not possible to supply electric power from the first power supply to the first control device, etc. for some reasons, it becomes possible to perform driving assistance by the second control device.

The second control device may include the switching control device. The second control device may permit driving assistance by the second control device if abnormality occurs in the first control device while the predetermined condition is satisfied and the switch control device keeps the second switch in the ON state with the second drive signal after electric power is supplied from the second power supply to the second control device when the second switch is turned on. In this manner, even in the case where driving assistance cannot be performed by the first control device, it becomes possible to perform driving assistance by the second control device.

The switch control device may stop outputting the second drive signal when an operation start switch of the vehicle is turned off, or when driving assistance by the first control device and the second control device is stopped. In this manner, it becomes possible to stop supply of electric power to the second control device at suitable timing.

The electric power supply apparatus may include a first dedicated signal line configured to transmit the first drive signal between the second switch and the third switch, a second dedicated signal line configured to transmit the second drive signal between the second switch and the switch control device, a common signal line configured to transmit the first drive signal and the second drive signal between the second switch and the third switch and between the second switch and the switch control device, and a fourth switch of a normal close type provided on a signal line connected to the a signal input part of the third switch or provided on the first dedicated signal line.

The switch control device may turn off the fourth switch while outputting the second drive signal and check electric conduction in the second dedicated signal line. Further, if electric conduction in the second dedicated signal line is not confirmed, the switch control device may output an error signal. In this manner, it becomes possible to confirm electric conduction in the second dedicated signal line easily.

The first control device performs first travel control to perform at least one of acceleration, deceleration, steering, and speed conversion of the vehicle automatically. Further, the second control device performs second travel control to perform at least one of acceleration, deceleration, steering, and speed conversion of the vehicle automatically. In this manner, in the structure where it is possible to perform automatic control separately by the two control devices (the first and second control devices), it is possible to suitably achieve the desired redundancy even in the case where the first to third switches as described above are used.

The vehicle according to the present invention includes the above electric power supply apparatus.

In the present invention, it becomes possible to suitably use the electric power supply apparatus in the structure having the two electric power systems.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A. First Embodiment

<A-1. Structure>
[A-1-1. Structure for Travel Control]
(A-1-1-1. Overall Structure)

Figure 1:
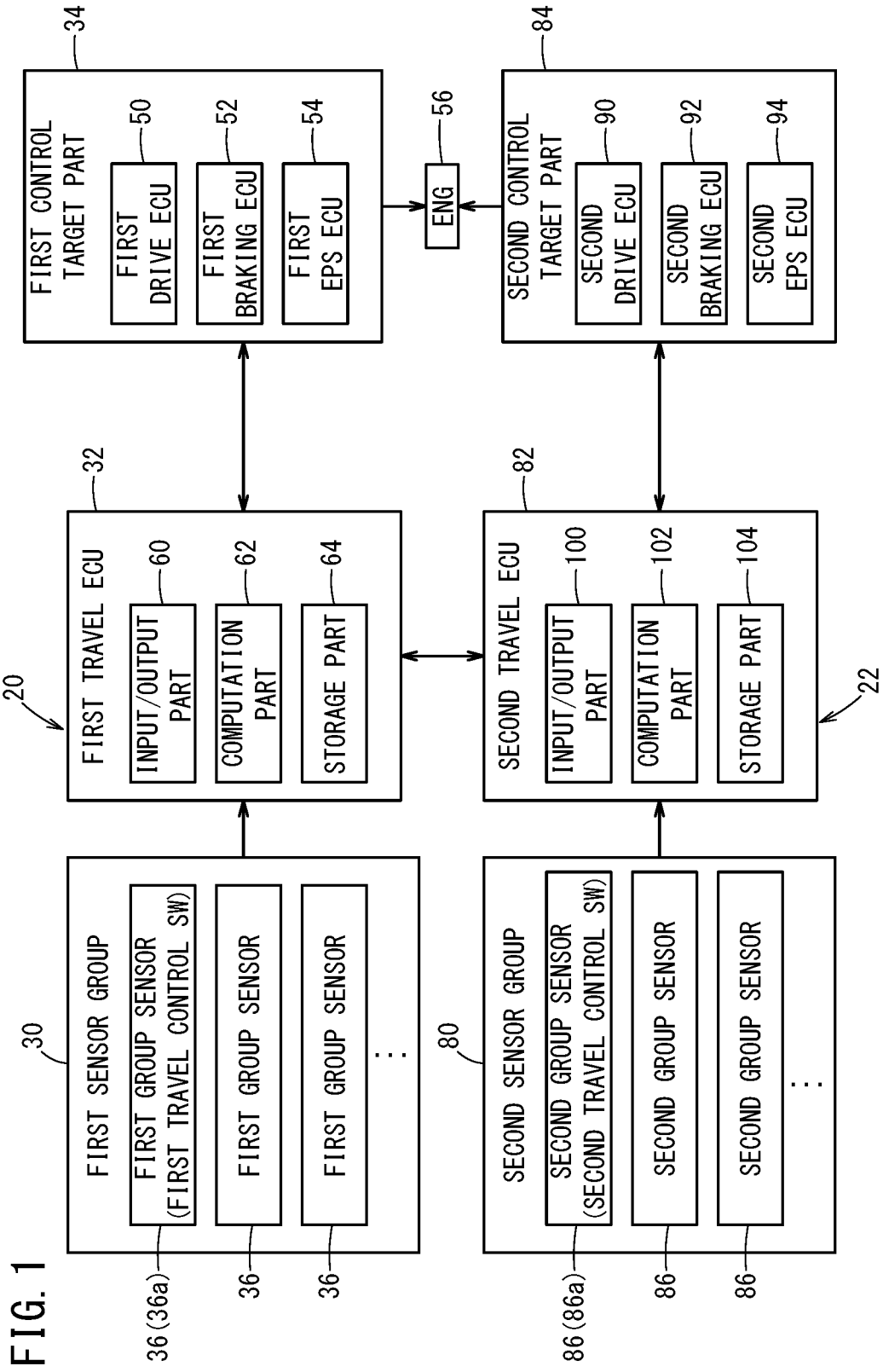
FIG. 1 is a block diagram showing structure for performing travel control in a vehicle according to a first embodiment of the present invention.

FIG. 1 is a block diagram showing structure for performing travel control in a vehicle 10 according to a first embodiment of the present invention (hereinafter also referred to as the "host vehicle 10"). The vehicle 10 includes a first travel control system 20 for performing first travel control, and a second travel control system 22 for performing second travel control. In the first travel control and the second travel control, at least one of acceleration, deceleration, steering, speed conversion of the vehicle 10 is performed automatically (the first travel control and the second travel control will be described later in detail).

(A-1-1-2. First Travel Control System 20)
(A-1-1-2-1. Overview of First Travel Control System 20)

As shown in FIG. 1, the first travel control system 20 includes a first sensor group 30, a first travel electric control unit 32 (hereinafter referred to as the "first travel ECU (electric control unit) 32"), and a first control target part 34. The first sensor group 30 includes a plurality of first group sensors 36 for obtaining sensor values needed for the first travel control.

(A-1-1-2-2. First Group Sensors 36)

Examples of the first group sensors 36 include a current position sensor, a vehicle ambient sensor, a vehicle body behavior sensor, a driving operation sensor, and a human machine interface (hereinafter referred to as the "HMI"). The current position sensor detects the current position of the vehicle 10 using a global positioning system (GPS) and the like. As for detection of the current position, a map database of a navigation system (not shown) may be used.

The vehicle ambient sensor detects information about an area around the host vehicle 10 (hereinafter also referred to as the "vehicle ambient information Ic"). Examples of the vehicle ambient sensor include a plurality of vehicle exterior cameras, at least one radar, a plurality of super sonic sensors, and a LIDAR (Light Detection And Ranging) sensor. Vehicle ambient information Ic is used for detecting obstacles (nearby vehicles, pedestrians, etc.), lane marks, signs, etc. around the host vehicle 10.

The vehicle body behavior sensor detects information about behaviors of the vehicle 10 (in particular, vehicle body) (hereinafter also referred to as the "vehicle body behavior information Ib"). Examples of the vehicle body behavior sensor include a vehicle velocity sensor, a lateral acceleration sensor, and a yaw rate sensor. For example, the vehicle body behavior information Ib is used for traveling (acceleration, deceleration, turn, etc.) of the vehicle 10.

The driving operation sensor detects information about driving operation by a driver (hereinafter also referred to as the "driving operation information Io"). Examples of the driving operation sensor include an accelerator pedal sensor, a brake pedal sensor, a steering angle sensor, and a shift position sensor. For example, the driving operation information Io is used for traveling (acceleration, deceleration, turn, etc.) of the vehicle 10.

The HMI receives operation inputs from an occupant (including the driver), and presents various items of information visually or aurally to the occupant. For example, the HMI includes a touch panel. Further, the HMI according to the first embodiment includes a first travel control switch 36a. The first travel control switch 36a is a switch for providing an instruction to start or end the first travel control by operation of the occupant.

(A-1-1-2-3. First Control Target Part 34)

The first control target part 34 is a part including a control target of a first travel ECU 32. The first control target part 34 includes a first drive electronic control unit 50 (hereinafter referred to as the "first drive ECU 50"), a first braking electronic control unit 52 (hereinafter referred to as the "first braking ECU 52"), and a first electric power steering electronic control unit 54 (hereinafter referred to as the "first EPS ECU 54").

The first drive ECU 50 performs drive force control of the vehicle 10 using an accelerator pedal operation amount, etc. detected by the accelerator pedal sensor. At the time of performing the drive force control, the first drive ECU 50 controls the drive control force Fd of the vehicle 10 through control of an engine 56 (drive source). It should be noted that the engine 56 may be regarded as part of the first control target part 34.

The first braking ECU 52 performs braking force control of the vehicle 10 using the brake pedal operation amount, etc. detected by the brake pedal sensor. At the time of performing the brake force control, the first braking ECU 52 controls the brake force Fb of the vehicle 10 through control of a brake mechanism (not shown), etc. The brake mechanism drives a brake member using a brake motor (or a hydraulic mechanism), etc. to generate the brake force Fb of the host vehicle 10. That is, in this case, the brake force Fb is generated by a friction force applied between a brake member such as a brake pad and wheels.

In addition to the above, or instead of the above, the brake force Fb may be generated by other methods. For example, in a possible method, the brake force Fb is generated by an engine brake. Further, in the case where the vehicle 10 has a traction motor (not shown), the brake force Fb may be generated accompanying regeneration by the traction motor.

The first EPS ECU 54 controls an EPS motor (not shown) in accordance with an instruction from the first travel ECU 32 to control the turn amount R of the vehicle 10. The turn amount R includes the steering angle θst, the lateral acceleration Glat, and the yaw rate Yr.

(A-1-1-2-4. First Travel ECU 32)

The first travel ECU 32 is a computer for performing various items of control regarding travel of the vehicle 10. For example, the first travel ECU 32 includes a central processing unit (CPU). The first travel control (described later) is included in the control performed by the first travel ECU 32.

As shown in FIG. 1, the first travel ECU 32 includes an input/output part 60, a computation part 62, and a memory part 64. It should be noted that some functions of the first travel ECU 32 may be carried out by external devices which are present outside the vehicle 10.

The input/output part 60 executes inputs/outputs to/from devices other than the first travel ECU 32 (first sensor group 30, first control target part 34, etc.). The input/output part 60 includes an A/D conversion circuit (not shown) for converting an inputted analog signal to a digital signal.

The computation part 62 performs computation based on signals from the first sensor group 30, etc. Further, the computation part 62 generates a signal for the first control target part 34 based on the computation result. The computation part 62 performs the first travel control (described later).

The computation part 62 realizes various functions by executing programs stored in the memory part 64. The programs may be supplied from external devices through a wireless communication device (not shown). Some functions of the programs may be realized by hardware (circuit components).

The memory part 64 stores programs and data used by the computation part 62. For example, the memory part 64 includes a random access memory (hereinafter referred to as the "RAM"). The RAM includes a volatile memory such as a register, and a non-volatile memory such as a flash memory. Further, the memory part 64 may include a read only memory (hereinafter referred to as the "ROM") in addition to the RAM.

(A-1-1-3. Second Travel Control System 22)
(A-1-1-3-1. Overview of Second Travel Control System 22)

The second travel control system 22 includes a second sensor group 80, a second travel electric control unit 82 (hereinafter referred to as the "second travel ECU (electric control unit) 82"), and a second control target part 84. The second sensor group 80 includes a plurality of second group sensors 86 for obtaining sensor values needed for the second travel control.

All or part of sensors of the second group sensors 86 may be identical to those of the first group sensors 36. In this regard, the first group sensors 36 and the second group sensors 86 may share sensors. Alternatively, the second group sensors 86 may include sensors that are different from the first group sensors 36. The HMI of the second sensor group 80 according to the first embodiment includes a second travel control switch 86a. The second travel control switch 86a is a switch which provides an instruction to start or end the second travel control by operation of the occupant. The same switch may be used as a common switch as both of the first travel control switch 36a and the second travel control switch 86a.

The second travel control is performed by the second travel ECU 92, and the details of the second travel ECU 82 will be described later.

The second control target part 84 is a part including a control target of a second travel ECU 82. The second control target part 84 includes a second drive electronic control unit 90 (hereinafter referred to as the "second drive ECU 90"), a second braking electronic control unit 92 (hereinafter referred to as the "second braking ECU 92"), and a second electric power steering electronic control unit 94 (hereinafter referred to as the "second EPS ECU 94"). It should be noted that the engine 56 may be regarded as part of the second control target part 84.

The second drive ECU 90, the second braking ECU 92, and the second EPS ECU 94 are the same as the first drive ECU 50, the first braking ECU 52, and the first EPS ECU 54. The second braking ECU 90 performs driving force control of the vehicle 10 using the accelerator pedal operation amount, etc. detected by the accelerator pedal sensor. The second braking ECU 92 performs braking force control of the vehicle 10 using the brake pedal operation amount, etc. detected by the brake pedal sensor. The second EPS ECU 94 controls the EPS motor in accordance with an instruction from the second travel ECU 82 to control the turn amount R of the vehicle 10.

(A-1-1-3-2. Second Travel ECU 82)

The second travel ECU 82 is a computer for performing various items of control regarding travel of the vehicle 10. For example, the second travel ECU 82 includes a central processing unit (CPU). The second travel control (described later) is included in the control performed by the second travel ECU 82.

As shown in FIG. 1, the second travel ECU 82 includes an input/output part 100, a computation part 102, and a memory part 104. It should be noted that some functions of the second travel ECU 82 may be carried out by external devices which are present outside the vehicle 10.

The input/output part 100, the computation part 102, and the memory part 104 of the second travel ECU 82 are the same as the input/output part 60, the computation part 62, and the memory part 64 of the first travel ECU 32. The input/output part 100 handles inputs/outputs to/from devices other than the second travel ECU 82 (second sensor group 80, second control target part 84, etc.).

The computation part 102 performs computation based on signals from the second sensor group 80, etc. Further, the computation part 102 generates a signal for the second control target part 84 based on the computation result. The computation part 102 performs the second travel control (described later). The memory part 64 stores programs and data used by the computation part 62.

[A-1-2. Structure for Supplying Electric Power]
(A-1-2-1. Overview)

Figure 2:
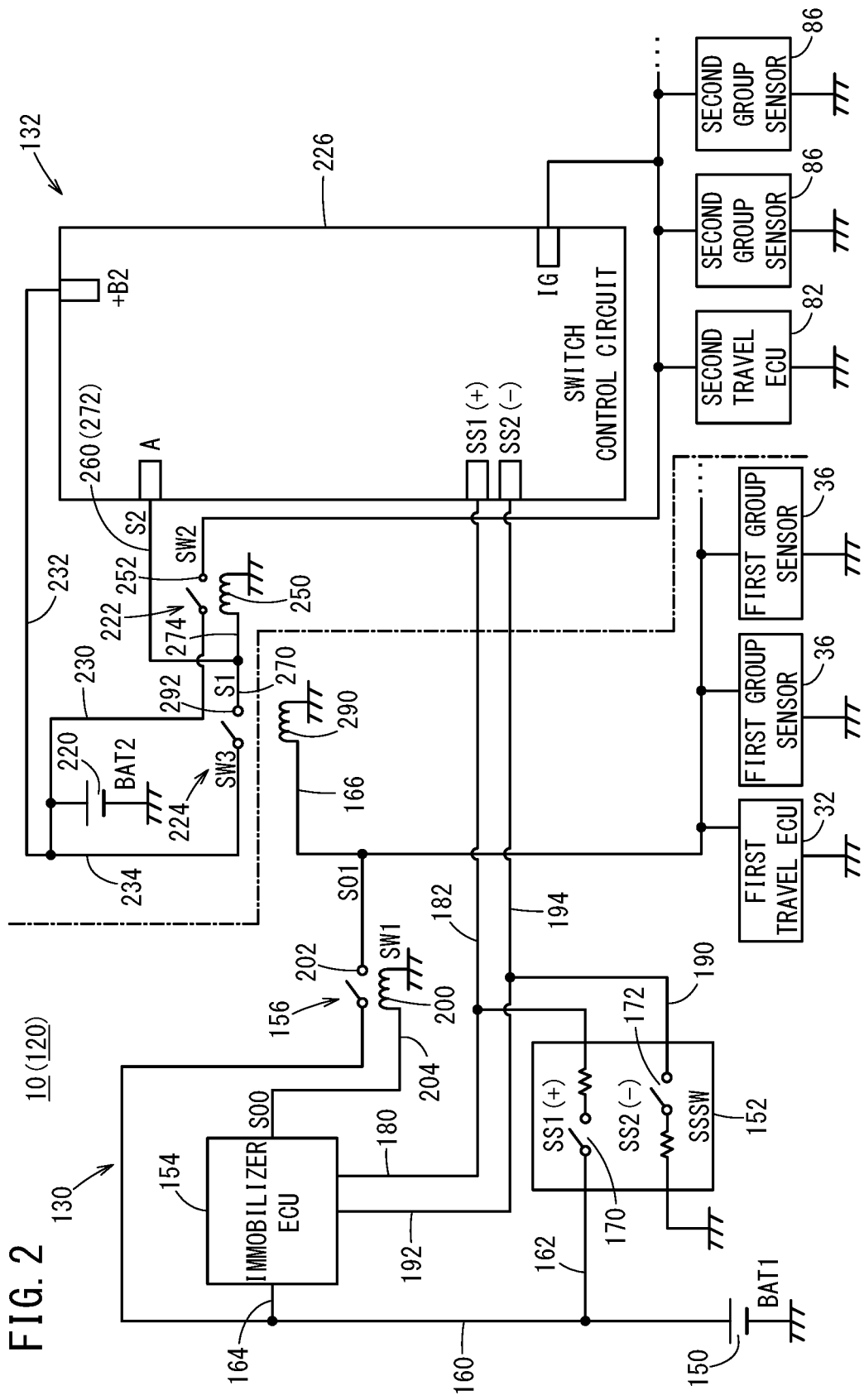
FIG. 2 is an electric circuit diagram schematically showing an electric power supply apparatus and peripheral components of the electric power supply apparatus of the vehicle according to a first embodiment.

FIG. 2 is an electric circuit diagram schematically showing an electric power supply apparatus 120 and peripheral components of the electric power supply apparatus 120 of the vehicle 10 according to the first embodiment. The electric power supply apparatus 120 is provided inside the vehicle 10, and supplies electric power to component parts of the vehicle 10. As shown in FIG. 2, the electric power supply apparatus 120 includes a first electric power system 130 using electric power of the first battery 150, and a second electric power system 132 using electric power of the second battery 220. The one dot chain line in FIG. 2 represents a rough border line between the first electric power system 130 and the second electric power system 132.

(A-1-2-2. First Electric Power System 130)
(A-1-2-2-1. Overview of First Electric Power System 130)

In addition to the first battery 150, the first electric power system 130 includes a starter switch 152, an immobilizer electronic control unit 154 (hereinafter referred to as the "immobilizer ECU 154"), and the first switch 156. Part of a third switch 224 and/or part of a switch control circuit 226 may be included in the first electric power system 130.

(A-1-2-2-2. First Battery 150)

The first battery 150 (first power supply) supplies electric power within the first electric power system 130. For example, the electric power of the first battery 150 is supplied to the first sensor group 30 (first group sensors 36), the first travel ECU 32, and the first control target part 34 (partially omitted in FIG. 2). The first battery 150 outputs the low voltage (e.g., 12V). For example, the first battery 150 is a lead battery. The first battery 150 can be charged based on the electric power from another power supply (not shown) such as an alternator (not shown), for example.

The electrical current Ibat1 (or electric power) from the first battery 150 is supplied to the first travel ECU 32 and the first group sensors 36, etc. through a main power line 160 (as described above, in FIG. 2, component parts other than the first travel ECU 32 and the first group sensors 36 have been omitted). Further, the electric current Ibat1 flows toward the starter switch 152 through a first branch power line 162 branching from the main power line 160. Further, the electric current Ibat1 from the first battery 150 is supplied to the immobilizer ECU 154 through a second branch power line 164 branching from the main power line 160. Furthermore, the electric current Ibat1 from the first battery 150 is supplied to a coil 290 (described later) of a third switch 224 by a third branch power line 166 branching from the main power line 160.

(A-1-2-2-3. Starter Switch 152)

The starter switch 152 (hereinafter also referred to as the "SSSW 152" (SSSW: Start/Stop SWitch) controls the start and stop of operation of the vehicle 10. The starter switch 152 of the first embodiment is a so-called push switch. When the starter switch 152 is pressed, the state of the vehicle 10 changes.

Specifically, if the starter switch 152 is pressed when the vehicle 10 is in the OFF state, the vehicle 10 is placed in an accessory (ACC) state. If the starter switch 152 is pressed when the engine is in the ACC state, operation of the engine 56 is started. Additional conditions may be required to start operation of the engine 56 (for example, depression of the brake pedal may be required). If the starter switch 152 is pressed when the engine 56 is in operation and the vehicle 10 is stopped, operation of the engine 46 is stopped, and the vehicle 10 is placed in the OFF state. The engine 56 may go through the ACC state before the vehicle 10 is placed in the OFF state.

As shown in FIG. 2, the starter switch 152 includes a first contact part 170 and a second contact part 172. The first contact part 170 is provided on the first branch power line 162. If the starter switch 152 is pressed by operation of the occupant, the first contact part 170 is placed in the ON state, and if the starter switch 152 is not pressed, the first contact part 170 is placed in the OFF state. The first branch power line 162 divides into a fourth branch power line 180 and a fifth branch power line 182.

The fourth branch power line 180 is connected to the immobilizer ECU 154. The fifth branch power line 182 is connected to an SS1 terminal of a switch control circuit 226. Therefore, it becomes possible for the immobilizer ECU 154 and the switch control circuit 226 to detect the pressing state of the starter switch 152.

The second contact part 172 is provided on a ground line 190. If the starter switch 152 is pressed by operation of the occupant, the second contact part 172 is placed in the ON state, and if the starter switch 152 is not pressed, the second contact part 172 is placed in the OFF state. The ground line 190 divides into a first branch ground line 192 and a second branch ground line 194. The first branch ground line 192 is connected to the immobilizer ECU 154. The second branch ground line 194 is connected to an SS2 terminal of the switch control circuit 226.

Though not shown in FIG. 2, the ON/OFF signal of the starter switch 152 is outputted to the first drive ECU 50, the second drive ECU 90 (FIG. 1), etc. through the immobilizer ECU 154.

(A-1-2-2-4. Immobilizer ECU 154)

For example, the immobilizer ECU 154 has a function of preventing a theft of the vehicle 10 (the detailed description of the immobilizer ECU 154 will be given later).

(A-1-2-2-5. First Switch 156)

Figure 5:
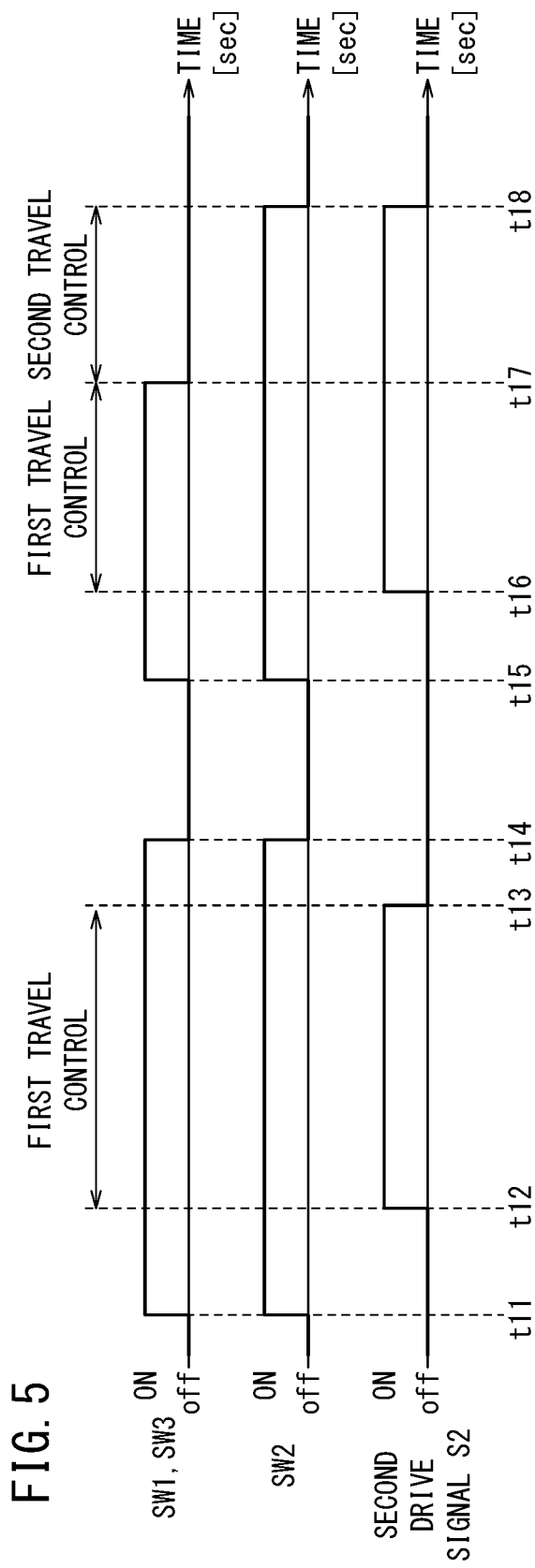
FIG. 5 is a time chart showing an example of operation of first to third switches and the switch control circuit according to the first embodiment.

The first switch 156 turns on or off the supply of electric power from the first battery 150 to the first travel ECU 32, etc. The first switch 156 of the first embodiment is a normal open type electromagnetic relay, and includes a coil 200 (control input part) and a contact part 202. When the coil 200 is energized, the contact part 202 is placed in the ON state. When the coil 200 is not energized, the contact part 202 is placed in the OFF state. The first switch 156 may comprise other elements (e.g., semiconductor switch). In FIG. 2 and FIG. 5 described later, the first switch 156 is denoted by "SW1".

The coil 200 is connected to the immobilizer ECU 154 through a signal line 204, and the contact part 202 is placed in the ON state with a drive signal S00 from the immobilizer ECU 154. Thus, the electrical current Ibat1 from the first battery 150 is supplied to the first travel ECU 32, etc. In the case where there is no drive signal S00 (Low), the contact part 202 is placed in the OFF state, and the electrical current Ibat1 is not supplied to the first travel ECU 32, etc. The immobilizer ECU 154 is operated by electric power from the first battery 150. Therefore, the electric power required for turning on the first switch 156 is supplied from the first battery 150.

(A-1-2-3. Second Electric Power System 132)
(A-1-2-3-1. Overview of Second Electric Power System 132)

The second electric power system 132 includes a second switch 222, a third switch 224, and a switch control circuit 226, in addition to the second battery 220.

(A-1-2-3-2. Second Battery 220)

The second battery 220 supplies electric power within a second electric power system 132. For example, the electric power of the second battery 220 is supplied to the second sensor group 80 (second group sensors 86), the second travel ECU 82, and the second control target part 84 (partially omitted in FIG. 2). The same power supply as the first battery 150 can be used as the second battery 220.

The electric current Ibat2 (or electric power) from the second battery 220 is supplied to the second travel ECU 82, the second group sensors 86, etc. through the main power line 230 (as described above, in FIG. 2, component parts other than the second travel ECU 82 and the second group sensors 86 have been omitted). Further, electric current Ibat2 is supplied to an IG terminal of the switch control circuit 226 through the main power line 230. Further, the electric current Ibat2 flows toward the switch control circuit 226 through the first branch power line 232 branching from the main power line 230. Further, the electric current Ibat2 is connected to the ground through a contact part 292 (described later) of the third switch 224 and a coil 250 (described later) of the second switch 222 through a second branch power line 234 branching from the main power line 230.

(A-1-2-3-3. Second Switch 222)

The second switch 222 turns on or off the supply of electric power from the second battery 220 to the second travel ECU 82, etc. The second switch 222 of the first embodiment is a normal open type electromagnetic relay, and includes the coil 250 (control input unit) and a contact part 252 (conductive part). When the coil 250 is energized, the contact part 252 is placed in the ON state, and the electric current Ibat2 from the second battery 220 is supplied to the second travel ECU 82, etc. When the coil 250 is not energized, the contact part 252 is placed in the OFF state, and the electric current Ibat2 is not supplied to the second travel ECU 82, etc. The second switch 222 may be constituted by other elements (e.g., semiconductor switch). In FIG. 2 and FIG. 5 described later, the second switch 222 is denoted by "SW2".

One end of the coil 250 is connected to the contact part 292 of the third switch 224 through the second branch power line 234, and connected to the switch control circuit 226 through a signal line 260. Further, the other end of the coil 250 is grounded.

Therefore, when at least one of a first drive signal S1 from the third switch 224 and a second drive signal S2 from the switch control circuit 226 (terminal A) is inputted to the coil 250, the contact part 252 of the second switch 222 is placed in the ON state. Further, if neither the first drive signal S1 nor the second drive signal S2 is inputted to the coil 250, the contact part 252 is placed in the OFF state. Therefore, in the case where the switch control circuit 226 is included in part of the second travel ECU 82, the second switch 222, the third switch 224, the switch control circuit 226, and the signal line 260 form a self-retaining circuit.

Hereinafter, part of the second branch power line 234 transmitting the first drive signal S1, between the coil 250 of the second switch 222 and the contact part 292 of the third switch 224 will be referred to as the first dedicated signal line 270. Further, part of the second branch power line 234 transmitting the second drive signal S2, between the coil 250 of the second switch 222 and the switch control circuit 226 (i.e., part of the signal line 260) will be referred to as the second dedicated signal line 272. Further, part of the second branch power line 234 transmitting both of the first drive signal S1 and the second drive signal S2, between the coil 250 of the second switch 222 and the contact part 292 of the third switch 224, and between the coil 250 of the second switch 222 and the switch control circuit 226 will be referred to as the common signal line 274.

On the main power line 230, the electric current Ibat 2 of the second battery 220 passes through the contact part 252 of the second switch 222. Further, the switch control circuit 226 is operated using electric power supplied from the second battery 220. Therefore, the electric power for turning on the second switch 222 is supplied from the second battery 220. The coil 290 of the third switch 224, meanwhile, is operated using electric power supplied from the first battery 150.

(A-1-2-3-4. Third Switch 224)

The third switch 224 performs turns on or off the flow of the first drive signal S1 to the second switch 222. The third switch 224 is turned on when the first switch 156 is turned on, and turned off when the first switch 156 is turned off. Stated otherwise, the first switch 156 and the third switch 224 are turned on by operation of the starter switch 152 (common operation by the occupant).

The third switch 224 of the first embodiment is a normal open type electromagnetic relay, and includes a coil 290 (control input part) and a contact part 292 (conductive part). When the coil 290 is energized, the contact part 292 is placed in the ON state, and the second switch 222 is turned on. When the coil 290 is not energized, the contact part 292 is placed in the OFF state, and the second switch 222 is turned off as well. The third switch 224 may comprise other elements (e.g., semiconductor switch). In FIG. 2 and FIG. 5 described later, the third switch 224 is denoted by "SW3".

The coil 290 is connected to the contact part 202 of the first switch 156. Therefore, when the drive signal S01 from the first switch 156 is inputted to the coil 290, the contact part 292 of the third switch 224 is placed in the ON state. If the drive signal S01 is not inputted to the coil 290, the contact part 292 is placed in the OFF state.

The electric current Ibat1 of the first battery 150 passes through the contact part 202 of the first switch 156. Therefore, the electric power required for turning on the third switch 224 is supplied from the first battery 150.

(A-1-2-4. Switch Control Circuit 226)

When predetermined conditions are satisfied, the switch control circuit 226 outputs the second drive signal S2 to the coil 250 of the second switch 222. Examples of the predetermined conditions herein include the state where the engine 56 is in operation. In this case, when operation of the engine 56 is started, the output of the second drive signal S2 is started, and when operation of the engine 56 is stopped, output of the second drive signal S2 is ended. Alternatively, the predetermined conditions may include the state where the first travel control by the first travel ECU 32 is being performed. In this case, when the first travel condition is started, the output of the second drive signal S2 is started. When the first travel control is ended, the output of the second drive signal S2 is ended. Alternatively, the predetermined conditions may include the state where the second travel control by the second travel ECU 82 is being performed. In this case, when the second travel control is started, the output of the second drive signal S2 is started, and when the second travel control is ended, the output of the second drive signal S2 is ended.

Electric power from the second battery 220 is supplied to the switch control circuit 226 (terminal +B2) through the first branch power line 232. In FIG. 2, though the switch control circuit 226 and the second travel ECU 82 are shown separately, the switch control circuit 226 is included in the second travel ECU 82.

<A-2. Various Controls>

[A-2-1. First Travel ECU 32]

The first travel ECU 32 performs the first travel control. In the first travel control, automatic driving operation is performed where at least one of acceleration, deceleration, steering, and speed conversion of the vehicle 10 is performed automatically. Examples of automatic driving operation herein include automatic pilot control, lane keep assist control, and automatic lane change control.

[A-2-2. Second Travel ECU 82]

The second travel ECU 82 performs second travel control. In the second travel control, automatic driving operation is performed where at least one of acceleration, deceleration, steering, and speed conversion of the vehicle 10 is performed automatically. The second travel control plays a role of a fail-safe mechanism for the first travel control. That is, the second travel ECU 82 performs the second travel control when abnormality has occurred in the first travel ECU 32 or the first electric power system 130. Automatic driving operation performed in the second travel control may be the same as automatic driving operation performed in the first travel control. Automatic driving operation performed in the second travel control may include control the vehicle 10 to stop in a road side zone.

Figure 3:
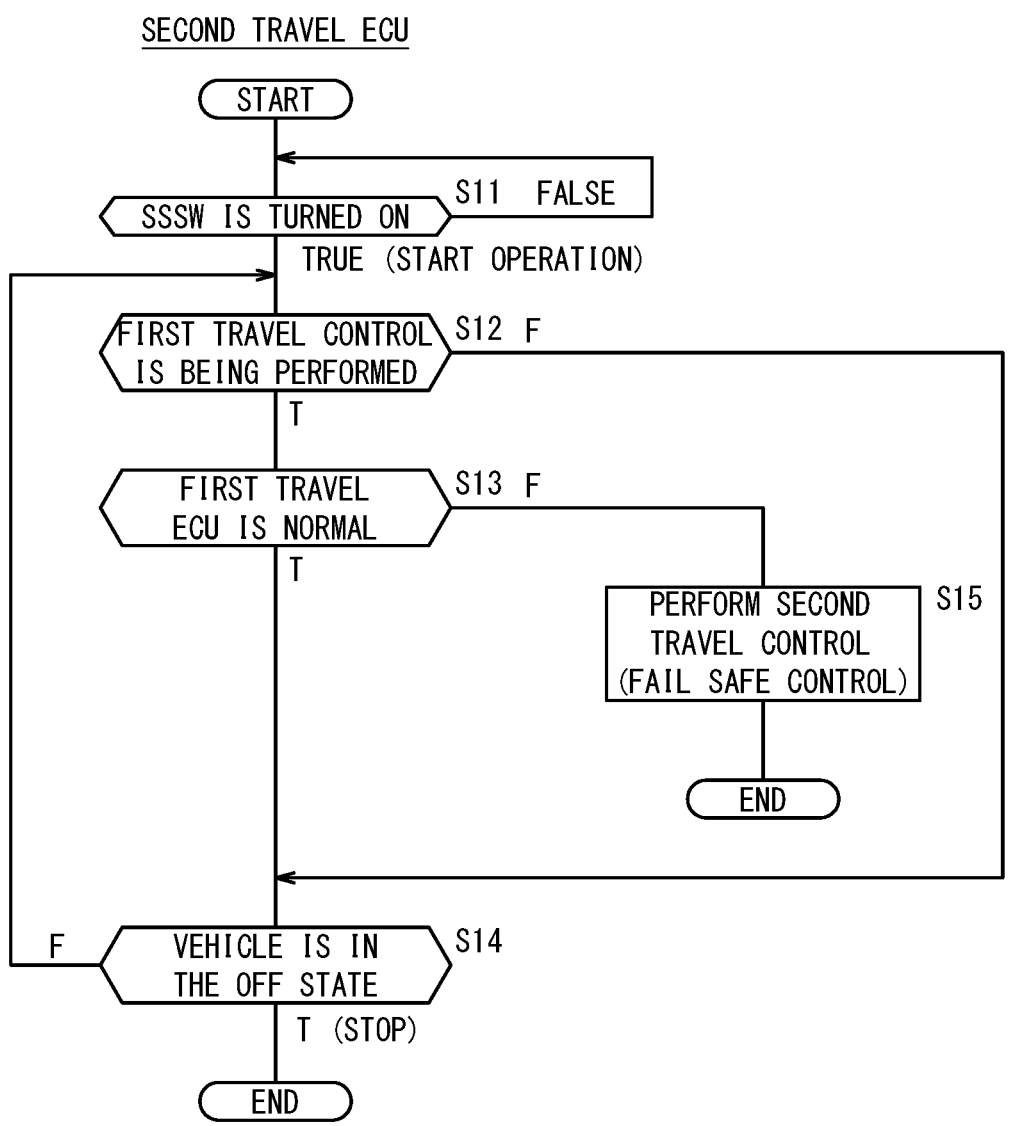
FIG. 3 is a flow chart showing operation and control of a second travel electronic control device according to the first embodiment.

FIG. 3 is a flow chart showing the operation and control of the second travel ECU 82 according to the first embodiment. In FIG. 3, step S11 which is the first determination step is labeled with "True" and "False". In the subsequent steps, "True" will be simply denoted by the "T", and "False" will be simply denoted by the "F". These abbreviations are also used in FIGS. 4 and 7.

In step S11 of FIG. 3, when an SSSW 152 (FIG. 2) is turned on (S11: TRUE), operation of the second travel ECU 82 is started. That is, when the SSSW 152 is turned on, the first switch 156 and the third switch 224 are turned on. Accordingly, the second switch 222 is turned on. As a result, electric power is supplied from the second battery 220 to the second travel ECU 82, and operation of the second travel ECU 82 is started.

After operation of the second travel ECU 82 is started, in step S12, the second travel ECU 82 determines whether or not the first travel control is being performed. For example, this determination is made based on a signal from the first travel control switch 36a (FIG. 1). In the case where the first travel control is being performed (S12: TRUE), the routine proceeds to step S13. In the case where first control is not being performed (S12: FALSE), the routine proceeds to step S14.

In step S13, the second travel ECU 82 determines whether or not the first travel ECU 32 is operating normally. This determination is made by monitoring instructions sent from the first travel ECU 32 to the first control target part 34. For example, if the instructions are transmitted at predetermined intervals while the first travel control is performed, the second travel ECU 82 determines that the first travel ECU 32 is operating normally. Further, if the transmission of the instructions stops while the first travel control is being performed, the second travel ECU 82 determines that the first travel ECU 32 is not operating normally.

Alternately, if the electric current Ibat1 detected by an electric current sensor (one of the first group sensors 36) provided in the first electric power system 130 (e.g., main power line 160) is zero even if the vehicle 10 is placed in the ON state, the second travel ECU 82 may determine that the first travel ECU 32 is not operating normally.

In the case where the first travel control is not being performed (S12: FALSE) or the first travel ECU 32 is operating normally (S13: TRUE), as long as the vehicle 10 is not placed in the OFF state by operation of the SSSW 152 (S14: FALSE), the routine returns to step S12. When the vehicle 10 is placed in the OFF state by operation of the SSSW 152 (S14: TRUE), the second travel ECU 82 is stopped. That is, when the vehicle 10 is placed in the OFF state, since output of the first drive signal S1 from the third switch 224 and output of the second drive signal S2 from the switch control circuit 226 are both stopped, the second travel ECU 82 is stopped. Alternatively, as described above, in the second travel control, the second travel ECU 82 may perform the automatic driving operation as in the case of the first travel control.

If the first travel ECU 32 is not operating normally (S13: FALSE), in step S15, the second travel ECU 82 performs the second travel control (fail safe control). For example, the second travel ECU 82 monitors an area around the vehicle 10 and detects a place where the vehicle 10 is allowed to stop. Then, the second travel ECU 82 moves the vehicle 10 up to the position where the vehicle 10 is allowed to stop, and stops the vehicle 10.

[A-2-3. Immobilizer ECU 154]

As shown in FIG. 2, the immobilizer ECU 154 is connected to the first battery 150 directly (with no switch in between). Therefore, the immobilizer ECU 154 can operate even when the vehicle 10 is in the OFF state.

The immobilizer ECU 154 monitors the states of the fourth branch power line 180 and the first branch ground line 192, and determines the ON/OFF state of the starter switch 152 (the first contact part 170 and the second contact part 172).

If the starter switch 152 is turned on when the vehicle 10 is in the OFF state, the immobilizer ECU 154 determines whether the vehicle 10 is allowed to be switched to the ACC state (the immobilizer ECU 154 demands authentication). That is, the immobilizer ECU 154 transmits an authentication information request signal to an area around the host vehicle 10 through a communication device (not shown). When a smart key (not shown) receives the authentication information request signal, the smart key transmits authentication information. If authentication is successful based on the received authentication information, the immobilizer ECU 154 places the vehicle 10 in the ACC state, and if authentication fails, the immobilizer ECU 154 keeps the vehicle 10 in the OFF state.

[A-2-4. Switch Control Circuit 226]

The switch control circuit 226 (terminal +B2) is connected to the second battery 220 directly (without any switch in between). Therefore, the switch control circuit 226 can operate even when the vehicle 10 is in the OFF state. In the first embodiment, it should be noted that operation of the switch control circuit 226 is started when the second switch 222 is turned on and the electric current Ibat2 from the second battery 220 is supplied to the IG terminal of the switch control circuit 226 through the main power line 230.

Figure 4:
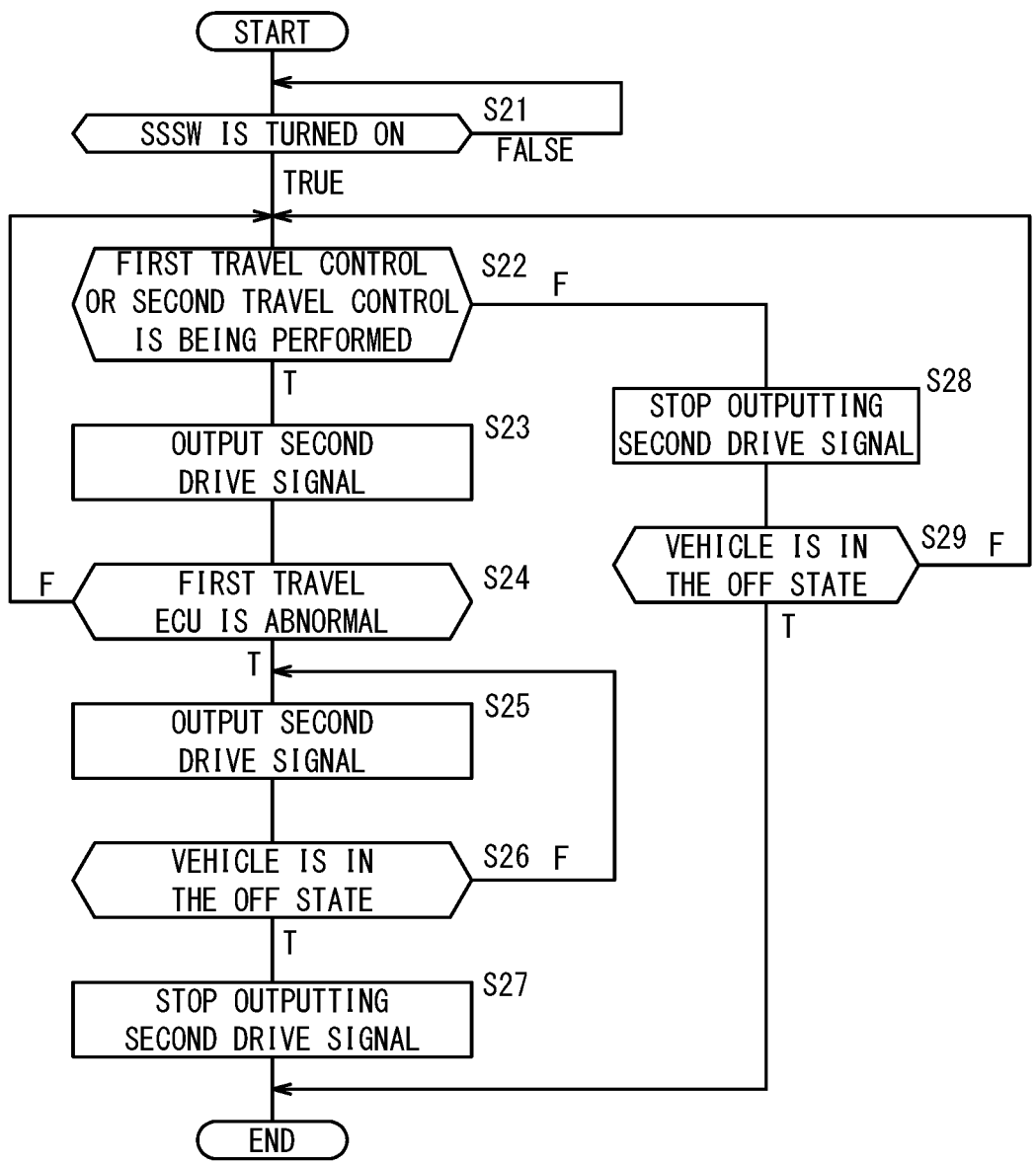
FIG. 4 is a flow chart showing operation and control of a switch control circuit according to the first embodiment.

FIG. 4 is a flow chart showing operation and control of the switch control circuit 226 according to the first embodiment. FIG. 5 is a time chart showing an example of operation of the first to third switches 156, 222, 224 and the switch control circuit 226 according to the first embodiment. In FIG. 5, the first to third switches 156, 222, 224 are denoted by SW1, SW2, SW3. Operation of the switch control circuit 226 is indicated by the second drive signal S2.

In step S21 of FIG. 4, the switch control circuit 226 determines whether or not the SSSW 152 has been turned on. If the SSSW 152 has been turned on (S21: TRUE), the electric current Ibat2 from the second battery 220 is supplied to the IG terminal of the switch control circuit 226 through the main power line 230. Thus, operation of the switch control circuit 226 is started, and the routine proceeds to step S22. If the SSSW 152 is turned on, and consequently, the first switch 156 and the third switch 224 are turned on, the second switch 222 is turned on as well (time points t11 and t15 of FIG. 5). If the SSSW 152 has not been turned on (S21: FALSE), step S21 is repeated.

In step S22, the switch control circuit 226 determines whether or not the first travel control or the second travel control is being performed. For example, this determination is made by communicating with the first travel ECU 32 and the second travel ECU 82 trough a signal line (not shown). In the case where the first travel control or the second travel control is being performed (S22: TRUE), the routine proceeds to step S23.

In step S23, the switch control circuit 226 outputs the second drive signal S2 to the second switch 222 (time points t12 and t16 in FIG. 5). As a result, even if output of the first drive signal S1 from the third switch 224 is stopped, the second switch 222 is kept in the ON state.

In step S24, the switch control circuit 226 determines whether or not the first travel ECU 32 has abnormality. This determination is made in the same manner as step S13 in FIG. 3. In the case where the first travel ECU 32 has abnormality (S24: TRUE), the routine proceeds to step S25. In the case where the first travel ECU 32 does not have abnormality (S24: FALSE), the routine returns to step S22.

In step S25, the switch control circuit 226 outputs the second drive signal S2 to the second switch 222, or continues to output the second drive signal S2 to the second switch 222 (a time point t17 of FIG. 5). Thus, even in the case where the output of the first drive signal S1 from the third switch 224 is stopped, the second switch 222 is kept in the ON state.

In step S26, the switch control circuit 226 determines whether or not the vehicle 10 has been placed in the OFF state. For example, the determination is made according to the pressing state of the SSSW 152. When the vehicle 10 is in the OFF state (S26: TRUE), the routine proceeds to step S27. When the vehicle 10 is not in the OFF state (S26: FALSE), the routine returns to step S25.

In step S27, the switch control circuit 226 stops the output of the second drive signal S2 (a time point t18 of FIG. 5). As a result, if the output of the first drive signal S1 from the third switch 224 has been stopped, the second switch 222 is turned off.

The routine returns to step S22, and if the first travel control and the second travel control are not being performed (S22: FALSE), in step S28, the switch control circuit 226 stops the output of the second drive signal S2 (a time point t13 of FIG. 5). In step S29, the switch control circuit 226 determines whether or not the vehicle 10 has been placed in the OFF state. This determination is made in the same manner as step S26. If the vehicle 10 has been placed in the OFF state (S29: TRUE), the current processing ends (a time point t14 in FIG. 5). If the vehicle 10 has not been placed in the OFF state (S29: FALSE), the routine returns to step S22.

<A-3. Advantages of the First Embodiment>

In the first embodiment as described above, electric power for the first travel ECU 32 (first control device) is supplied from the first battery 150 (first power supply), and electric power for the second travel ECU 82 is supplied from the second battery 220 (second power supply) (FIG. 2). In the structure, electric power is supplied to the first travel ECU 32 and the second travel ECU 82 using different electric power supply systems (first electric power system 130 and second electric power system 132). Therefore, even if abnormality occurs in one of the electric power systems, it becomes possible to continue control of the vehicle 10 by the first travel ECU 32 or the second travel ECU 82 using the other of the electric power systems.

Further, the first switch 156 and the third switch 224 are turned on by common operation of the occupant (FIG. 2). Therefore, by the common operation of the occupant, it becomes possible to start supply of electric power to the first travel ECU 32 and the second travel ECU 82. That is, when the first switch 156 is turned on, supply of electric power from the first battery 150 to the first travel ECU 32 is started. Further, when the third switch 224 is turned on, the first drive signal S1 is inputted to the second switch 222, and the second switch 222 is turned on. As a result, supply of electric power from the second battery 220 to the second travel ECU 82 is started.

It may be considered to turn on the second switch 222 without using the third switch 224 (or turn on the first switch 156 and the second switch 222 by the common operation). However, in such a case, since supply of electric power from the first battery 150 is interrupted, it becomes impossible to keep the second switch 222 (and the first switch 156) in the ON state.

In the first embodiment, the second switch 222 is turned on when the first drive signal S1 or the second drive signal S2 is inputted, and the second switch 222 is turned off when the first drive signal S1 and the second drive signal S2 are not input. Therefore, even if it becomes impossible to keep the "third switch 224" in the ON state due to interruption of supply of electric power from the first battery 150, it is possible to keep the second switch 222 in the ON state with the second drive signal S2 sent from the switch control circuit 226. Stated otherwise, even in the case where the first travel ECU 32 is stopped and the third switch 224 is turned off due to the interruption of the supply of electric power from the first battery 150, it becomes possible to keep the second switch 222 in the ON state with the second drive signal S2, and continue the supply of electric power from the second battery 220 to the second travel ECU 82.

Further, even in the case where it becomes impossible to input the second drive signal S2 to the second switch 222 for some reasons (disconnection of the signal line 272 for the second drive signal S2, etc.), it becomes possible to continue the supply of electric power to the second travel ECU 82 by inputting the first drive signal S1 to the second switch 222.

As described above, in the first embodiment, it becomes possible to suitably use the electric power supply apparatus 120 having the structure including the two electric power systems.

In the first embodiment, the switch control circuit 226 starts outputting the second drive signal S2 (S23) in a manner that the start of outputting is triggered when an instruction to start driving assistance by the first travel ECU 32 (first control device) or the second travel ECU 82 (second control device) is provided by the occupant (S22 in FIG. 4: TRUE).

In this manner, it becomes possible to supply electric power to the second travel ECU 82 in a situation where it is highly necessary to supply electric power to the second travel ECU 82. Further, it becomes possible to suppress standby electric power of the second travel ECU 82 before executing the driving assistance. In particular, in the case where the output of the second drive signal S2 is started in a manner that the start of outputting is triggered by the occupant's instruction to start driving assistance by the first travel ECU 32, even if electric power from the first battery 150 cannot be supplied to the first travel ECU 32, etc. for some reasons, it becomes possible to perform driving assistance by the second travel ECU 82.

In the first embodiment, the second travel ECU 82 (second control device) includes the switch control circuit 226. Further, the second travel ECU 82 permits driving assistance by the second travel ECU 82 (S15) if abnormality occurs in the first travel ECU 32 (first control device) (S13: FALSE in FIG. 3 while predetermined conditions are satisfied and the switch control circuit 226 keeps the second switch 222 in the ON state with the second drive signal S2 after electric power is supplied from the second battery 220 (second power supply) to the second drive ECU 82 when the second switch 222 is turned on. In this manner, even if it is not possible to perform driving assistance by the first travel ECU 32, it becomes possible to perform driving assistance by the second travel ECU 82.

In the first embodiment, when the starter switch 152 is turned off (S26 of FIG. 4: TRUE) or when driving assistance by the first travel ECU 32 (first control device) and the second travel ECU 82 (second control device) is stopped (S22: FALSE), the switch control circuit 226 stops outputting the second drive signal S2 (S27, S28). In this manner, it becomes possible to stop supply of electric power to the second travel ECU 82 at suitable timing.

In the first embodiment, the first travel ECU 32 (first control device) performs the first travel control in which at least one of acceleration, deceleration, steering, and speed conversion of the vehicle 10 is performed automatically. Further, the second travel ECU 82 (second control device) performs second travel control in which at least one of acceleration, deceleration, steering, and speed conversion of the vehicle 10 is performed automatically. In this manner, in the structure where automatic control can be performed separately by the two control devices (the first travel ECU 32 and the second travel ECU 82), even when the first to third switches 156, 222, 224 as described above are used, it is possible to suitably achieve the desired redundancy.

B. Second Embodiment

<B-1. Structure (Difference from the First Embodiment)>

Figure 6:
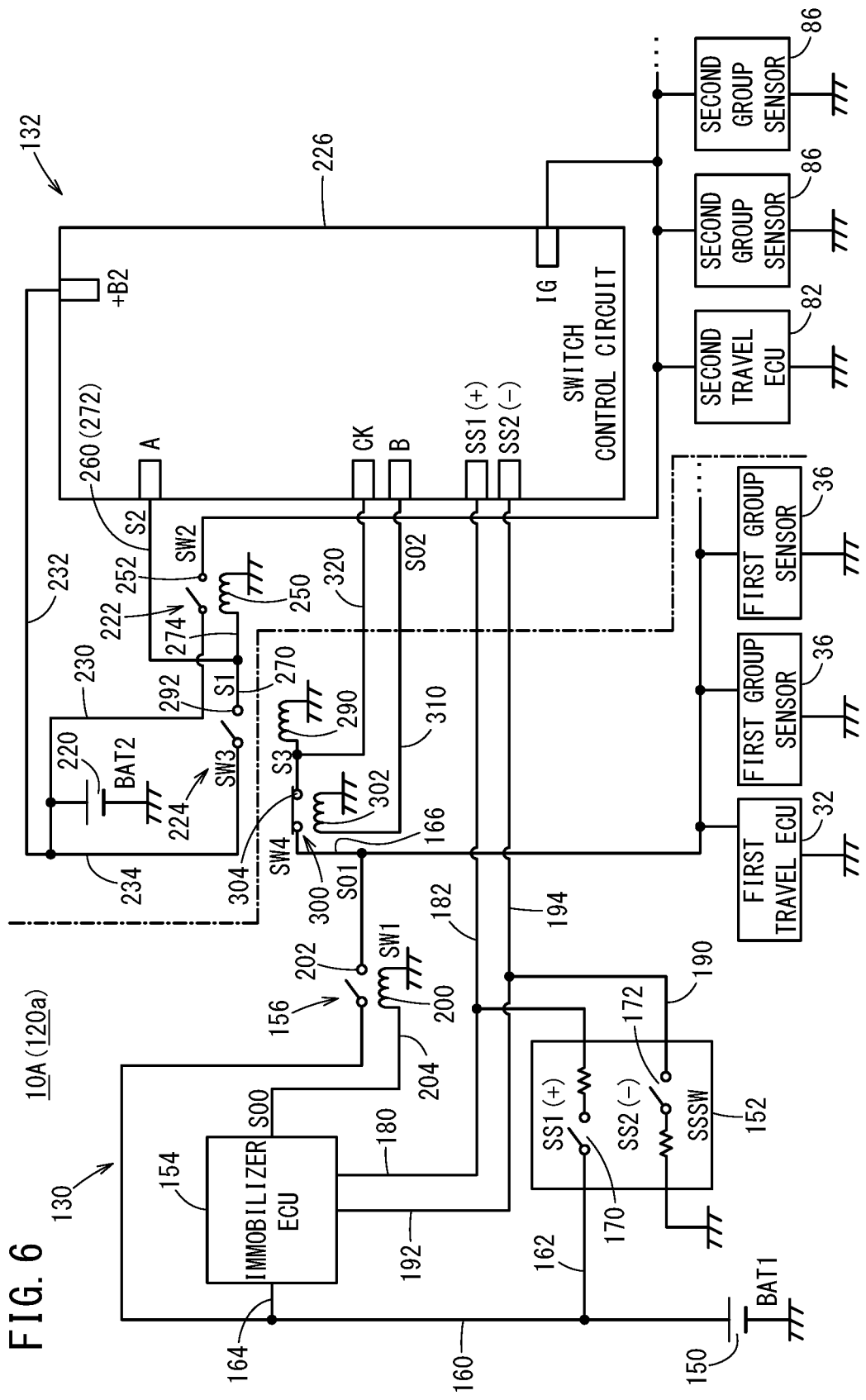
FIG. 6 is an electric circuit diagram schematically showing an electric power supply apparatus and its peripheral components according to the second embodiment.

FIG. 6 is an electric circuit diagram schematically showing an electric power supply apparatus 120a and peripheral components thereof according to the second embodiment. The electric power supply apparatus 120a supplies electric power to each component part of the vehicle 10A. Basically, the vehicle 10A according to the second embodiment has the same structure as the vehicle 10 according to the first embodiment. Hereinafter, the constituent elements of the vehicle 10A according to the second embodiment that are identical to those of the vehicle 10 according to the first embodiment are labeled with the same reference numerals, and detailed description thereof is omitted.

The power supply apparatus 120a according to the second embodiment includes a fourth switch 300. The fourth switch 300 is a normal close type switch provided on a third branch power line 166 branching from a main power line 160. As described later, the fourth switch 300 may be provided at a different position. In FIG. 6, the fourth switch 300 is denoted by "SW4".

The fourth switch 300 includes a coil 302 and a contact part 304. The coil 302 is connected to a terminal B of the switch control circuit 226 through a signal line 310. The contact part 304 is provided on a third branch power line 166. When the drive signal S02 from the switch control circuit 226 (terminal B) is OFF (Low), the fourth switch 300 is in the ON state (the closed state). When the drive signal S02 is ON (high), the fourth switch 300 is in the OFF state (the open state).

The switch control circuit 226 confirms electric conduction in a second dedicated signal line 272 (signal line transmitting only the second drive signal S2 between the coil 250 of the second switch 222 and the switch control circuit 226) using the fourth switch 300.

A point between the coil 290 of the third switch 224 and the contact part 304 of the fourth switch 300 is connected to a CK terminal of the switch control circuit 226 through a branch power line 320. Based on the input to the CK terminal, the switch control circuit 226 may monitor the ON failure and the OFF failure of the fourth switch 300 (This operation will be described later).

<B-2. Control>

Figure 7:
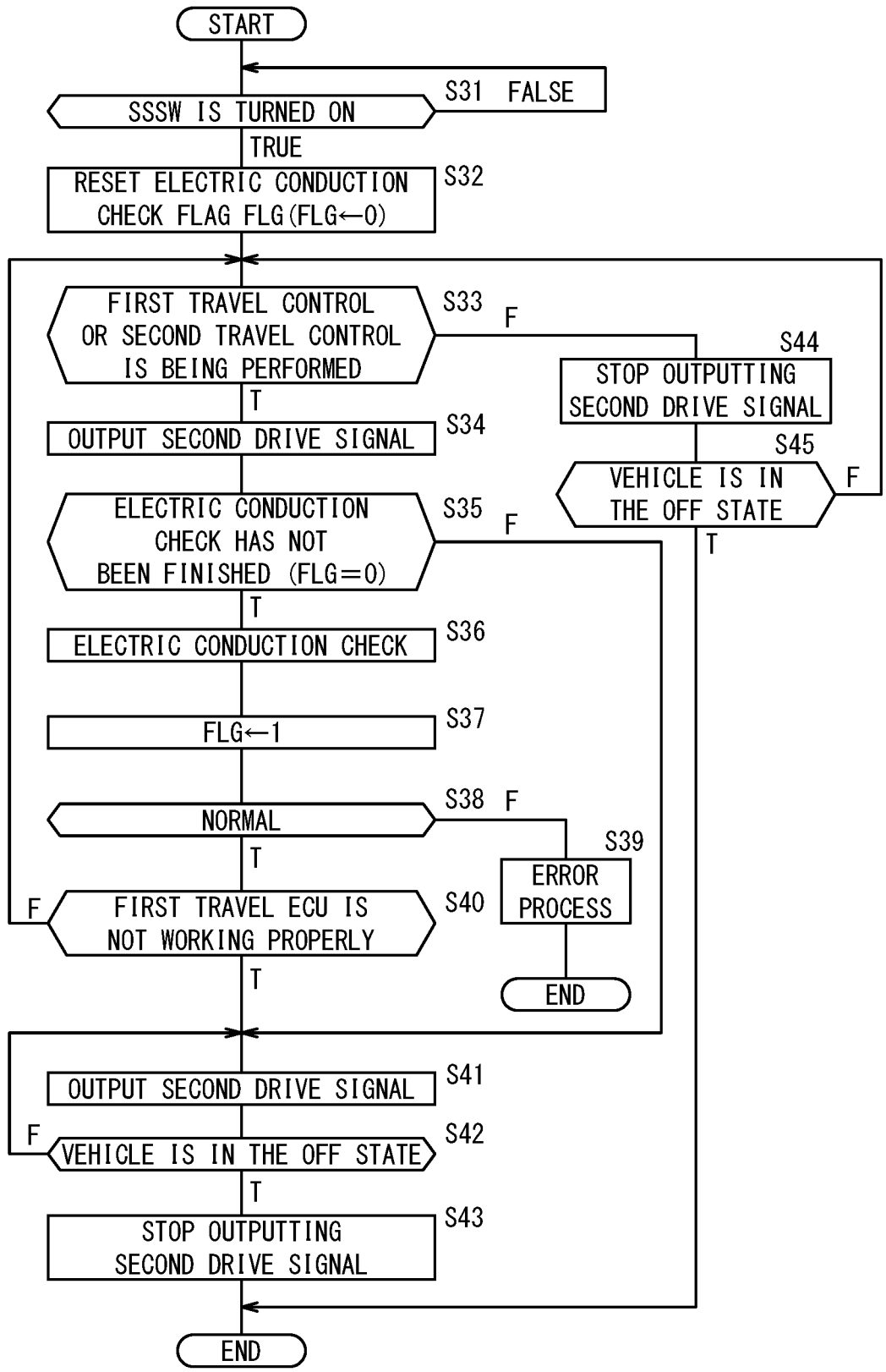
FIG. 7 is a flow chart showing operation and control of a switch control circuit according to the second embodiment.
Figure 8:
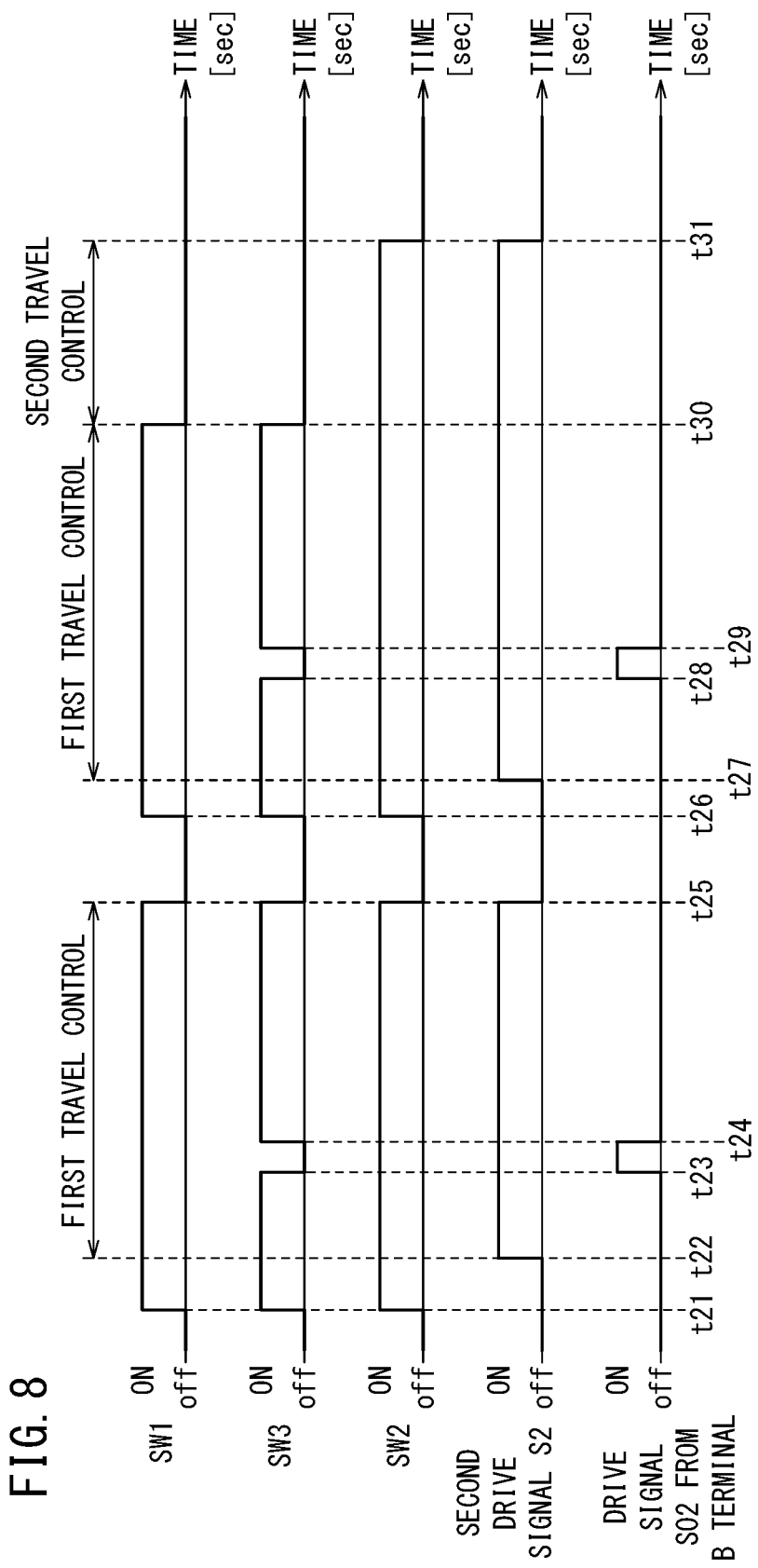
FIG. 8 is a time chart showing an example of operation of first to third switches and the switch control circuit according to the second embodiment.

FIG. 7 is a flow chart showing operation and control of a switch control circuit 226 according to the second embodiment. FIG. 8 is a time chart showing an example of operation of the first to third switches 156, 222, 224 and the switch control circuit 226 according to the second embodiment. As described above, the switch control circuit 226 confirms electric conduction of the second dedicated signal line 272 using the third drive signal S3 transmitted to the fourth switch 300. In FIG. 8, the first to third switches 156, 222, 224 are denoted by SW1, SW2, SW3. Further, operation of the switch control circuit 226 is indicated by the second drive signal S2 and the third drive signal S3.

In step S31 of FIG. 7, the switch control circuit 226 determines whether or not the SSSW 152 has been turned on. When SSSW 152 is turned on (S31: TRUE), the electric current Ibat 2 from the second battery 220 is supplied to the IG terminal of the switch control circuit 226 through the main power line 230. As a result, operation of the switch control circuit 226 is started, and the routine proceeds to step S32. When the SSSW 152 is turned on, the first switch 156 and the third switch 224 are turned on, and the second switch 222 is turned on as well (time points t21 and t26 of FIG. 8). If the SSSW 152 has not been turned on (S31: FALSE), step S31 is repeated.

In step S32, the switch control circuit 226 resets an electric conduction check flag FLAG (hereinafter also referred to as the "flag FLG") to "0".

In step S33, the switch control circuit 226 determines whether or not the first travel control or the second travel control is being performed. The determination is made in the same manner as step S22 of FIG. 4. In the case where the first travel control or the second travel control is being performed (S33: TRUE), the routine proceeds to step S34.

In step S34, the switch control circuit 226 outputs the second drive signal S2 to the second switch 222 (time points t22, t27 of FIG. 8). Therefore, even after the output of the first drive signal S1 from the third switch 224 is stopped, the second switch 222 remains the ON state.

In step S35, the switch control circuit 226 determines whether or not the electric conduction check has been finished. Specifically, the switch control circuit 226 determines whether or not the current flag FLG is "0". If the electric conduction check has been finished (S35: TRUE), the routine proceeds to step S36. If the conduction check has not been finished (S35: FALSE), the routine proceeds to step S41.

In step S36, the switch control circuit 226 performs an electric conduction check. Specifically, the switch control circuit 226 outputs a drive signal 02 from a B terminal to the fourth switch 300 (time points t23 to 24, and t28 to t29 in FIG. 8). Thus, the normal close type fourth switch 300 is turned off, and the output of the third drive signal S3 to the third switch 224 is stopped. Therefore, even if the first switch 156 is placed in the ON state, the first drive signal S1 is not transmitted from the third switch 224 to the second switch 222. At this time, for example, the switch control circuit 226 confirms the output of a current sensor (one of second group sensors 86) provided on the main power line 230. In this manner, it becomes possible to check whether or not electric current flows through the second dedicated signal line 272 which transmits the second drive signal S2.

In step S37, the switch control circuit 226 sets the flag FLG to "1". In step S38, the switch control circuit 226 determines whether or not the result of the electric conduction check is normal (i.e., whether or not electrical current flows through the second dedicated signal line 272). If the result of the conduction check is normal (S38: TRUE), the routine proceeds to step S40. If the result of the conduction check is not normal (S38: FALSE), in step S39, the switch control circuit 226 performs an error correction process. In the error correction process, an alarm light (not shown) is turned on.

Steps S40 to S45 are performed in the same manner as steps S24 to S29 in FIG. 4. Further, the time points t25, t30, t31 in FIG. 8 are the same as the time points t14, t17, and t18 in FIG. 5.

It should be noted that, for example, in addition to the electric conduction check (S36), the switch control circuit 226 may monitor the ON failure and OFF failure of the normal close type fourth switch 300 based on the input to the CK terminal.

For example, prior to step S36, the switch control circuit 226 determines whether the OFF failure has occurred in the fourth switch 300 based on the input to the CK terminal. That is, if the input to the CK terminal does not exceed first predetermined voltage even though the drive signal S02 is not outputted in the state while the first switch 156 is in the ON state, the switch control circuit 226 determines that an OFF failure has occurred in the fourth switch 300.

Further, for example, before and after steps S36 and S37, the switch control circuit 226 determines whether the ON failure of the fourth switch 300 has occurred based on the input to the CK terminal. That is, if the input to the CK terminal exceeds second predetermined voltage even though the drive signal S02 is outputted to the signal line 310 of the fourth switch 300 while the first switch 156 is placed in the ON state, the switch control circuit 226 determines that an OFF failure has occurred in the fourth switch 300. Determination of the ON failure or the OFF failure may be made not only for the fourth switch 300 but also for the other switches (e.g., the first switch 156).

<B-3. Advantages of the Second Embodiment>

The second embodiment as described above offers the following advantages, in addition to, or instead of the advantages of the first embodiment.

That is, in the second embodiment, the electric power supply apparatus 120a includes the first dedicated signal line 270 for transmitting the first drive signal S1 between the second switch 222 and the third switch 224, the second dedicated signal line 272 for transmitting the second drive signal S2 between the second switch 222 and the switch control circuit 226, the common signal line 274 for transmitting the first drive signal S1 and the second drive signal S2 between the second switch 222 and the third switch 224 and the second switch 222 and the switch control circuit 226, and the normal close type fourth switch 300 provided on the third branch power line 166 connected to the coil 290 (signal input part) of the third switch 224 (FIG. 6). Further, the switch control circuit 226 turns off the fourth switch 300 while outputting the second drive signal S2, and confirms electric conduction in the second dedicated signal line 272 (S36 of FIG. 7). In the case where the electric conduction in the second dedicated signal line 272 has not been confirmed (S38: FALSE), the switch control circuit 226 outputs an error signal (S39). In this manner, it becomes possible to confirm electric conduction in the second dedicated signal line 272 easily.

C. Modified Embodiments

The present invention is not limited to the above described embodiments. It is a matter of course that various structures can be adopted based on the description of the specification. For example, the following structure can be adopted.

<C-1. Structure of Vehicle 10>

[C-1-1. Overall Structure]

In the structure of the first embodiment, the first travel control system 20 and the second travel control system 22 are separated (FIG. 1). However, the present invention is not limited in terms of using at least the second switch 222 and the third switch 224 for performing ON/OFF control of the second travel ECU 82. For example, part or all of the first sensor group 30 and part or all of the second sensor group 80 may be shared. Likewise, part or all of the first control target part 34 and part or all of the second control target part 84 may be shared. The same thing applies to the second embodiment.

[C-1-2. First Battery 150 and Second Battery 220]

In the embodiments, the first battery 150 comprising the lead battery was used as the first power supply for the first electric power system 130 (FIG. 2). However, for example, in terms of supplying electric power to the first electric power system 130, it is possible to use other power supplies instead of or in addition to the first battery 150. Examples of the other power supplies include a lithium ion battery, a capacitor, an alternator, etc. In this case, as necessary, a voltage converter may be used together. The same thing applies to the second battery 220.

[C-1-3. First to Fourth Switches 156, 222, 224, and 300]

In the first embodiment, the first switch 156 is an electromagnetic relay having the coil 200 and the contact part 202 (FIG. 2). However, in terms of performing ON/OFF control of the second travel ECU 82 using the third switch 224 having the coil 290 (signal input part) of the first electric power system 130 and the contact part 292 (conductive part) of the second electric power system 132, and the signal line 260 from the switch control circuit 226, the present invention is not limited in this respect.

For example, by directly connecting the signal line 204 (FIG. 2) from the immobilizer ECU 154 or the fourth branch power line 180 from the SSSW 152 to the coil 290, it is possible to omit the first switch 156. Alternatively, a fifth switch (not shown) may be provided as another switch on a side closer to the first battery 150 than the first switch 156. Then, it is possible to supply electric power from the first battery 150 to part of the first travel control system 20 through a branch power line branching from between the first switch 156 and the fifth switch.

The fourth switch 300 of the second embodiment is provided on the third branch power line 166 branching from the main power line 160 (FIG. 6). However, in terms of performing ON/OFF control of the third drive signal S3 to the coil 290 of the third switch 224 using the drive signal S02 from the switch control circuit 226, the present invention is not limited in this respect. For example, the fourth switch 300 may be provided on the first dedicated signal line 270 transmitting only the first drive signal S1 between the coil 250 of the second switch 222 and the contact part 292 of the third switch 224.

[C-1-4. Switch Control Circuit 226]

In the first embodiment, the switch control circuit 226 is part of the second travel ECU 82. However, in terms of controlling the second switch 222 using the second drive signal S2, the present invention not limited in this respect. The switch control circuit 226 and the second travel ECU 82 may be separate component parts. The same thing applies to the second embodiment.

In the first embodiment, it is assumed that the switch control circuit 226 (switch control device) is a logic IC (IC: Integrated Circuit) (FIG. 2). However, for example, in terms of transmitting the second drive signal S2 to the second switch 222 when predetermined conditions are satisfied, the present invention is not limited in this respect. For example, instead of the logic IC, a CPU and programs may be used to form the switch control device. The same thing applies to the second embodiment.

<C-2. Control>

In the first travel control and the second travel control according to the first embodiment, at least one of acceleration, deceleration, steering, and speed conversion of the vehicle 10 is performed automatically. However, in terms of performing ON/OFF control of supplying electric power using the third switch 224 having the coil 290 (signal input part) of the first electric power system 130 and the contact part 292 (conductive part) of the second electric power system 132, and the signal line 260 from the switch control circuit 226, the present invention is not limited in this respect. For example, the first travel control or the second travel control may perform control other than the control of automatically performing at least one of acceleration, deceleration, steering, and speed conversion of the vehicle 10.

In the first embodiment, the first travel control (or the first travel ECU 32) is used normally, and the second travel control (or the second travel ECU 82) is used for fail safe (FIG. 3). However, for example, in terms of performing ON/OFF control of the second travel ECU 82 using the third switch 224 having the coil 290 (signal input part) of the first electric power system 130 and the contact part 292 (conductive part) of the second electric power system 132, and the signal line 260 from the switch control circuit 226, the present invention is not limited in this respect. For example, the second travel control (or the second travel ECU 82) may be used normally, and the first travel control (or the first travel ECU 32) may be used for fail safe. Alternatively, it may be possible to use both of the first travel control (or the first travel ECU 32) and the second travel control (or the second travel ECU 82) normally. The same thing applies to the second embodiment.

<C-3. Other>

In the first embodiment, the switch control circuit 226 is operated in accordance with the flow shown in FIG. 4. However, as long as it is possible to obtain the advantages of the present invention, the content of flow (the order of the steps) is not limited in this respect. For example, the order of step S22 and S23 may be interchanged.

What is claimed is:

1. An electric power supply apparatus comprising:
   a first power supply configured to supply electric power to a first control device configured to control a vehicle;
   a second power supply configured to supply electric power to a second control device configured to control the vehicle;
   a second switch configured to perform ON/OFF switching of supply of electric power from the second power supply to the second control device;
   a third switch configured to perform ON/OFF switching of a first drive signal to the second switch; and
   a switch control device configured to output a second drive signal to the second switch when a predetermined condition is satisfied,
   wherein the second switch is turned on when the first drive signal or the second drive signal is inputted;
   the second switch is turned off when the first drive signal and the second drive signal are not input, and
   the second control device permits driving assistance by the second control device if abnormality occurs in the first control device while the predetermined condition is satisfied and the switch control device keeps the second switch in the ON state with the second drive signal.

2. The electric power supply apparatus according to claim 1, wherein outputting the second drive signal from the switch control device is triggered when operation of a drive source of the vehicle is started or when an occupant provides an instruction to start driving assistance by the first control device or the second control device.

3. The electric power supply apparatus according to claim 1, wherein the switch control device stops outputting the second drive signal when an operation start switch of the vehicle is turned off, or when driving assistance by the first control device and the second control device is stopped.

4. The electric power supply apparatus according to claim 1, wherein the first control device performs first travel control to perform at least one of acceleration, deceleration, steering, and speed conversion of the vehicle automatically; and
   the second control device performs second travel control to perform at least one of acceleration, deceleration, steering, and speed conversion of the vehicle automatically.

5. The electric power supply apparatus according to claim 1, further comprising:
   a first switch configured to perform ON/OFF switching of supply of electric power from the first power supply to the first control device, wherein
   the first switch and the third switch are configured to be turned on by common operation by an occupant.

6. An electric power supply apparatus comprising:
   a first power supply configured to supply electric power to a first control device configured to control a vehicle;
   a second power supply configured to supply electric power to a second control device configured to control the vehicle;
   a second switch configured to perform ON/OFF switching of supply of electric power from the second power supply to the second control device;
   a third switch configured to perform ON/OFF switching of a first drive signal to the second switch; and a switch control device configured to output a second drive signal to the second switch when a predetermined condition is satisfied, a first dedicated signal line configured to transmit the first drive signal between the second switch and the third switch;

a second dedicated signal line configured to transmit the second drive signal between the second switch and the switch control device;

a common signal line configured to transmit the first drive signal and the second drive signal between the second switch and the third switch and between the second switch and the switch control device; and a fourth switch of a normal close type provided on a signal line connected to the a signal input part of the third switch or provided on the first dedicated signal line, wherein the second switch is turned on when the first drive signal or the second drive signal is inputted, the second switch is turned off when the first drive signal and the second drive signal are not input, the switch control device turns off the fourth switch while outputting the second drive signal, and checks electric conduction in the second dedicated signal line, and if the electric conduction in the second dedicated signal line is not confirmed, the switch control device outputs an error signal.

7. The electric power supply apparatus according to claim 6, further comprising:

a first switch configured to perform ON/OFF switching of supply of electric power from the first power supply to the first control device, wherein the first switch and the third switch are configured to be turned on by common operation by an occupant.

8. A vehicle having an electric power supply apparatus comprising:

a first power supply configured to supply electric power to a first control device configured to control a vehicle;

a second power supply configured to supply electric power to a second control device configured to control the vehicle;

a second switch configured to perform ON/OFF switching of supply of electric power from the second power supply to the second control device;

a third switch configured to perform ON/OFF switching of a first drive signal to the second switch; and a switch control device configured to output a second drive signal to the second switch when a predetermined condition is satisfied, wherein the second switch is turned on when the first drive signal or the second drive signal is inputted;

the second switch is turned off when the first drive signal and the second drive signal are not input, and the second control device permits driving assistance by the second control device if abnormality occurs in the first control device while the predetermined condition is satisfied and the switch control device keeps the second switch in the ON state with the second drive signal.

9. An electric power supply apparatus comprising:

a first power supply configured to supply electric power to a first control device configured to control a vehicle;

a second power supply configured to supply electric power to a second control device configured to control the vehicle;

a second switch configured to perform ON/OFF switching of supply of electric power from the second power supply to the second control device;

a third switch configured to perform ON/OFF switching of a first drive signal to the second switch; and a switch control device configured to output a second drive signal to the second switch when a predetermined condition is satisfied, wherein the second switch is turned on when the first drive signal or the second drive signal is inputted;

the second switch is turned off when the first drive signal and the second drive signal are not input, the first control device and the second control device are capable of performing driving assistance, and if abnormality occurs in the first control device while the first control device performs driving assistance, the switch control device performs driving assistance as a failsafe mechanism for the driving assistance by the first control device.

10. The electric power supply apparatus according to claim 9, further comprising:

a first switch configured to perform ON/OFF switching of supply of electric power from the first power supply to the first control device, wherein the first switch and the third switch are configured to be turned on by common operation by an occupant.

* * * * *